United States Patent
Just

(10) Patent No.: US 8,465,081 B2
(45) Date of Patent: Jun. 18, 2013

(54) CONVERTIBLE TOP COVER AND HEADLINER INTERCONNECTED BY BOWS

(75) Inventor: Jan Just, Bloomfield Hills, MI (US)

(73) Assignee: Magna Car Top Systems GmbH, Rochester Hills, MI (US)

(*) Notice: Subject to any disclaimer, the term of this patent is extended or adjusted under 35 U.S.C. 154(b) by 1636 days.

(21) Appl. No.: 10/598,340

(22) PCT Filed: Feb. 28, 2005

(86) PCT No.: PCT/US2005/006526
§ 371 (c)(1), (2), (4) Date: Aug. 24, 2006

(87) PCT Pub. No.: WO2005/084291
PCT Pub. Date: Sep. 15, 2005

(65) Prior Publication Data
US 2007/0182199 A1    Aug. 9, 2007

Related U.S. Application Data

(60) Provisional application No. 60/548,325, filed on Feb. 27, 2004.

(51) Int. Cl.
*B60J 7/00*    (2006.01)

(52) U.S. Cl.
USPC ................................. 296/107.06

(58) Field of Classification Search
USPC ................................. 296/107.06
See application file for complete search history.

(56) References Cited

U.S. PATENT DOCUMENTS

| 2,213,912 | A | * | 9/1940 | Hooper | 160/395 |
| 2,501,392 | A | | 3/1950 | Keller | |
| 2,986,315 | A | * | 5/1961 | Zimmerman | 224/42.32 |
| 3,875,623 | A | * | 4/1975 | Johnston | 24/580.1 |
| 4,529,243 | A | | 7/1985 | Kaltz et al. | |

(Continued)

FOREIGN PATENT DOCUMENTS

| DE | 10113101 A1 | 9/2002 |
| DE | 20118834 U1 | 3/2003 |

(Continued)

OTHER PUBLICATIONS

International Search Report for PCT/US05/06526 dated Aug. 18, 2006.

(Continued)

*Primary Examiner* — H Gutman
(74) *Attorney, Agent, or Firm* — Brooks Kushman, P.C.

(57) ABSTRACT

A convertible top having a cover and a headliner interconnected by transverse bows having fore and aft slots that are connected to either the cover or the headliner by flexible welts. A method of making a convertible top with welts that are assembled to the bows by sliding first and second welts lengthwise into fore and aft slots formed on the bows. The bows are assembled to the top stack after the cover and headliner are attached to the bows. One or more bows may include a central portion and two end portions that are assembled to opposite ends of the central portion in a range of predetermined positions. A method is disclosed for making a bow by extruding the central portion of the bow and molding the right and left end portions of the bow in a thixotropic molding process.

5 Claims, 3 Drawing Sheets

U.S. PATENT DOCUMENTS

| | | | |
|---|---|---|---|
| 4,644,599 A * | 2/1987 | Wolcott | 5/504.1 |
| 4,998,766 A * | 3/1991 | Biermacher et al. | 296/136.05 |
| 5,018,783 A | 5/1991 | Chamings et al. | |
| 5,100,195 A | 3/1992 | Patel | |
| 5,511,844 A | 4/1996 | Boardman | |
| 5,540,476 A | 7/1996 | Cowsert | |
| 5,624,151 A | 4/1997 | Guswiler | |
| 5,829,820 A | 11/1998 | Cowsert | |
| 5,857,736 A | 1/1999 | Feathers | |
| 5,887,936 A * | 3/1999 | Cowsert | 296/107.07 |
| 6,227,603 B1 * | 5/2001 | Brock | 296/100.14 |
| 6,282,791 B1 * | 9/2001 | Patelczyk | 29/897.2 |
| 6,318,791 B1 | 11/2001 | Pfertner | |
| 6,341,810 B2 * | 1/2002 | Hartmann et al. | 296/107.01 |
| 6,390,531 B1 | 5/2002 | Schutt | |
| 6,530,621 B1 * | 3/2003 | Williams et al. | 296/216.04 |
| 6,550,842 B1 * | 4/2003 | Halbweiss et al. | 296/116 |
| 6,623,063 B1 | 9/2003 | Grubbs et al. | |
| 6,685,257 B1 | 2/2004 | Beland et al. | |
| 6,802,554 B1 * | 10/2004 | Just et al. | 296/107.09 |
| 6,871,900 B2 | 3/2005 | Pfertner et al. | |
| 7,144,063 B2 * | 12/2006 | Garska | 296/118 |

FOREIGN PATENT DOCUMENTS

| | | |
|---|---|---|
| EP | 0806313 A1 | 11/1997 |
| JP | S57-080370 B | 11/1980 |
| JP | 2001191160 | 7/2001 |

OTHER PUBLICATIONS

European Patent Office, Supplementary European Search Report for the corresponding European Patent Application No. EP 05724133 mailed Dec. 17, 2009.

* cited by examiner

CONVERTIBLE TOP COVER AND HEADLINER INTERCONNECTED BY BOWS

CROSS-REFERENCE TO RELATED APPLICATION

This application claims the benefit of U.S. provisional application Ser. No. 60/548,325 filed Feb. 27, 2004.

BACKGROUND OF THE INVENTION

1. Field of the Invention

The present invention relates to convertible tops having a headliner.

2. Background Art

Convertible tops are popular options on vehicles. Convertible tops may be extended to cover a passenger compartment or retracted to provide an open passenger compartment. Convertible tops have a soft top cover that is supported by a top stack linkage in an extended, or covering, position. The convertible top is folded by the top stack linkage and generally stowed in a storage compartment or in a portion of the trunk of a vehicle when in its retracted, or open, position.

Convertible tops may be provided as a single layer, or covet only, design. One disadvantage of single layer convertible tops is that the transversely extending bows and top stack linkage are exposed to the view of the vehicle occupant. This gives an unfinished appearance to the convertible top. Also, wind noise and vibration of the top cover are more noticeable to the vehicle occupants.

To overcome problems associated with cover only convertible tops, headliners have been developed that span the interior surface of the convertible tops, covering the transversely extending bows and also partially covering the top stack linkage. Headliners provide a more finished appearance and ameliorate the effects of wind noise and vibration of the top cover.

Longitudinally extending webbing belts or stay pads are required in prior art convertible top designs to position and align the transversely extending bows. These belts add cost and complicate assembly operations. Headliners for convertible tops tend to complicate assembly operations and repair or service operations. Another problem that may be encountered with the prior art headliner connection systems is that if the headliner becomes disconnected from the bows or top cover, the headliner may sag or hang in an unattractive manner from the convertible top. If this occurs, it will adversely affect customer satisfaction and lead to warranty expense.

Convertible tops generally have 4 or 5 bows that may be of different lengths and must be formed as different parts. Each bow normally requires its own set of dedicated tooling.

There is a need for a convertible top having a headliner that is less expensive to manufacture and is durable. There is also a need for a method of manufacturing a convertible top cover and headliner that eliminates the need for alignment webbing belts or stay pads for aligning the transversely extending bows. There is also a need for increasing manufacturing efficiency and minimizing tooling expense.

The above problems and needs are addressed by Applicant's invention as described below.

SUMMARY OF THE INVENTION

According to one aspect of the present invention, a convertible top for a vehicle is provided that has a top stack linkage having a right side and a left side that are interconnected by a plurality of bows. The bows extend transversely between the right and left sides of the top stack linkage. At least one of the bows has a front slot on a forwardly facing edge and a back slot on a rearwardly facing edge. A cover spans between the right and left sides of the top stack linkage and over the bows. The cover has a first flexible welt with a first head portion and a first body portion. The first flexible welt is received in either the front slot or the back slot. A headliner spans between the right and left sides of the top stack linkage and below the bows. The headliner has a second flexible welt with a second head portion and a second body portion. The second flexible welt is received in the other of the front slot and the back slot. The first and second flexible welts exert oppositely directed forces on the front and back edges of the bows.

According to other aspects of the invention as they relate to the convertible top, the first welt may resist relative movement of the cover relative to the bows in one fore and aft direction, while the second welt resists relative movement of the headliner relative to the bows in the other fore and aft direction. The plurality of bows are attached to the cover and headliner and function to align the cover and headliner relative to the top stack. The bows extend in a transverse direction and parallel to each other. The head portions of the first and second welts are received in a head receiving portion of the slots and the body portions of the first and second welts are received in the neck portions of the slots. The head portion of each welt has an elongated core portion that is wrapped by a fabric member that extends around the core portion, while the body portion of each welt extends from the head portion through the neck of the slot.

According to another aspect of the present invention, a method of making a convertible top is provided. The method comprises providing a top stack including a plurality of articulated links on a right side and a left side of the convertible top. A plurality of bows are provided wherein at least one of the bows has a fore slot and an aft slot at spaced locations on the bow. A cover having a first welt is assembled to one of the plurality of bows by sliding the first welt lengthwise into one of the fore and aft slots. A headliner having a second welt is assembled to at least one of the plurality of bows by sliding a second welt lengthwise into the other of the fore and aft slots. The bows are assembled to the plurality of articulated links on the right and left sides of the top stack so that the cover and headliner are aligned with the bows and the plurality of the articulated links by the first and second welts.

According to another aspect of the method of making a convertible top described above, the first welt may be formed on the cover by sewing a first flexible fabric portion that extends around a first core to the cover and forming a second welt on the headliner by sewing a second flexible fabric portion that extends around a second core to the headliner.

According to another aspect of the present invention, a top stack for a convertible top having right and left sets of articulated links that are interconnected by a plurality of bows is provided. At least one of the bows comprises a central portion and two end portions. The two end portions are secured to opposite ends of the central portion. The end portions are each secured to the central portion in a range of predetermined positions to provide a bow of a specified length depending upon the position in which the end portions are secured to the central portion.

According to other aspects of the invention as they relate to the top stack, the central portion may have an upper surface and the end portions may each have a top surface wherein the upper surface and the top surfaces define a continuous cover supporting surface when the end portions are assembled to the central portion. The top stack may also comprise a channel that extends through the length of the central portion wherein a tang formed on each of the end portions is secured in each end of the channel. Each of the ends may have a curved fore lip and a curved aft lip. Each of the ends is formed with a connector that secures the bow to the right and left sets of articulated links.

According to another aspect of the invention, the method of making a bow for a top stack of a convertible top is provided. The method comprises extruding a central portion of the bow, molding right and left end portions of the bow, and assembling the right and left end portions of the bow to the center portion.

According to other aspects of the invention as they relate to the method of making a bow for a top stack, the central portion may be extruded in a mold that produces an extruded member that is curved along the length of the central portion. The right and left end portions may be molded in a thixotropic magnesium molding process. Multiple sets of fastener receptacles may be molded on the right and left end portions and the step of assembling the end portions to the central portion may be performed by fastening the central portion with fasteners to different sets of fastener receptacles to provide bows of different lengths that utilize the same end portions and central portion.

The above aspects and other aspects, features and advantages of the present invention are readily apparent from the following detailed description of the best mode for carrying out the invention when taken in connection with the accompanying drawings.

DETAILED DESCRIPTION OF THE PREFERRED EMBODIMENT(S)

Figure 1:
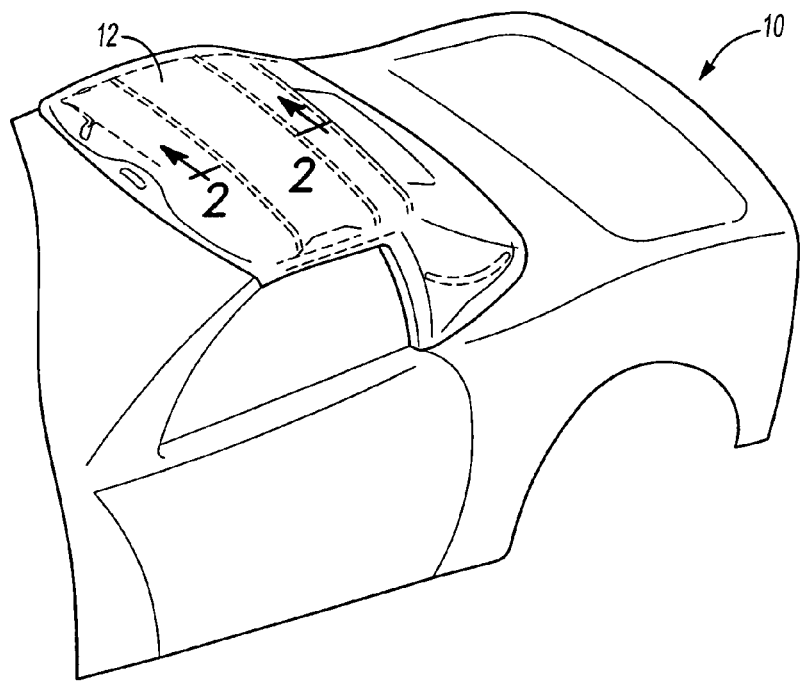
FIG. 1 is a fragmentary perspective view of a vehicle having a convertible top.

Referring now to FIG. 1, a vehicle 10 is shown diagrammatically with a convertible top 12. The convertible top 12 is shown in its extended, or passenger compartment covering, position.

Figure 2:
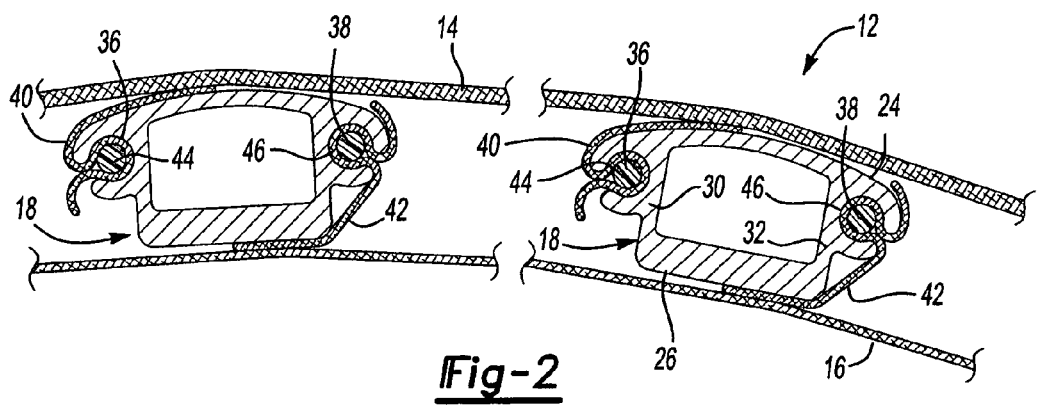
FIG. 2 is a cross-sectional view taken along line 2-2 in FIG. 1.
Figure 3:
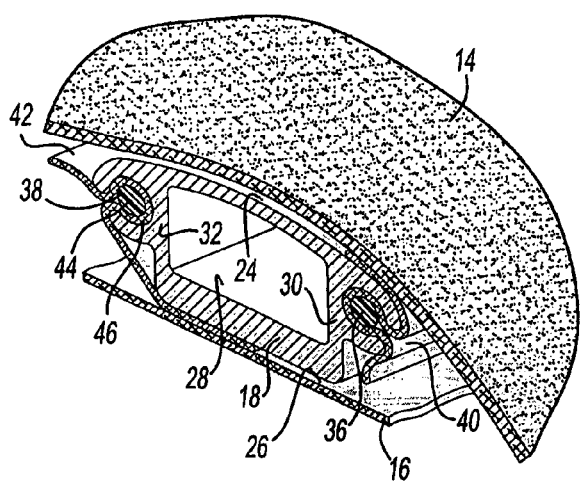
FIG. 3 is a fragmentary cross-sectional view of a bow for a convertible top connected to the top cover and headliner.

Referring to FIGS. 2 and 3, the convertible top 12 is shown in a fragmentary cross-section. The convertible top 12 includes an exterior covering 14 and a headliner 16. The exterior covering 14 and headliner 16 are attached to a plurality of bows 18. The bows 18 extend transversely across the vehicle as shown in phantom in FIG. 1. The bows 18 have a top surface 24, or top wall, and a headliner facing surface 26, or bottom wall. The bows 18 also define an interior cavity 28 that extends through the bows to reduce weight and material usage. The bows 18 are curved extruded aluminum bows or may be made from another lightweight alloy material. A front wall 30 and rear wall 32 extend between the top surface 24 and headliner facing surface 26.

A front keyhole slot 36 is formed as part of the extrusion on the front wall 30 of each bow. A rear keyhole slot 38 is formed on the rear wall 32. An exterior covering welt strip 40 is sewn, adhered, or otherwise secured to the exterior covering 14. A headliner welt strip 42 is sewn, adhered, or otherwise secured to the headliner 16. The welt strips 40 and 42 extend transversely across the convertible top 12 in the location where the bows 18 are to be positioned between the exterior covering 14 and headliner 16.

Each welt strip 40, 42 includes a core 44 formed of wire, plastic rod, or the like that is retained within a portion of a flexible web 46 forming the welt strips 40, 42. The welt strips 40, 42 are assembled to the front and rear keyhole slots 36, 38.

The convertible top 12 is assembled by first securing the exterior covering welt strip 40 to the exterior covering 14. The headliner welt strip 42 is then secured to the headliner 16, preferably by sewing, heat welding, gluing, or otherwise securing the welt in place. The core 44 and its covering of flexible web material 46 is then inserted longitudinally into either the front keyhole slot 36 or rear keyhole slot 38. If the exterior covering welt strip 40 is first installed in the bow 18, the core 44 will be placed in the front keyhole slot 36 until it is centered relative to the exterior covering 14. Next, the core 44 of the headliner welt strip 42 is longitudinally inserted into the rear keyhole slot 38 of the bow 18 to secure the headliner welt strip 42 within the rear keyhole slot 38. As will be readily understood, the headliner could be secured to the front keyhole slot 36, while the exterior covering welt strip 40 could be inserted in the rear keyhole slot 38. After the welts 40, 42 are installed in the keyhole slots 36, 38, they cannot be removed through the slots unless they slide longitudinally out of the slot. This provides a simple and effective securing mechanism that is very durable.

The bows 18 are held in place as a result of the tension applied to the exterior covering 14 and headliner 16 when the convertible top 12 is secured in its extended position. No webbing belts or stay pads are required to locate the bows 18 when the top is moved to the extended position. Connection of the bows to the top stack mechanism will be described below with reference to FIG. 4.

Figure 4:
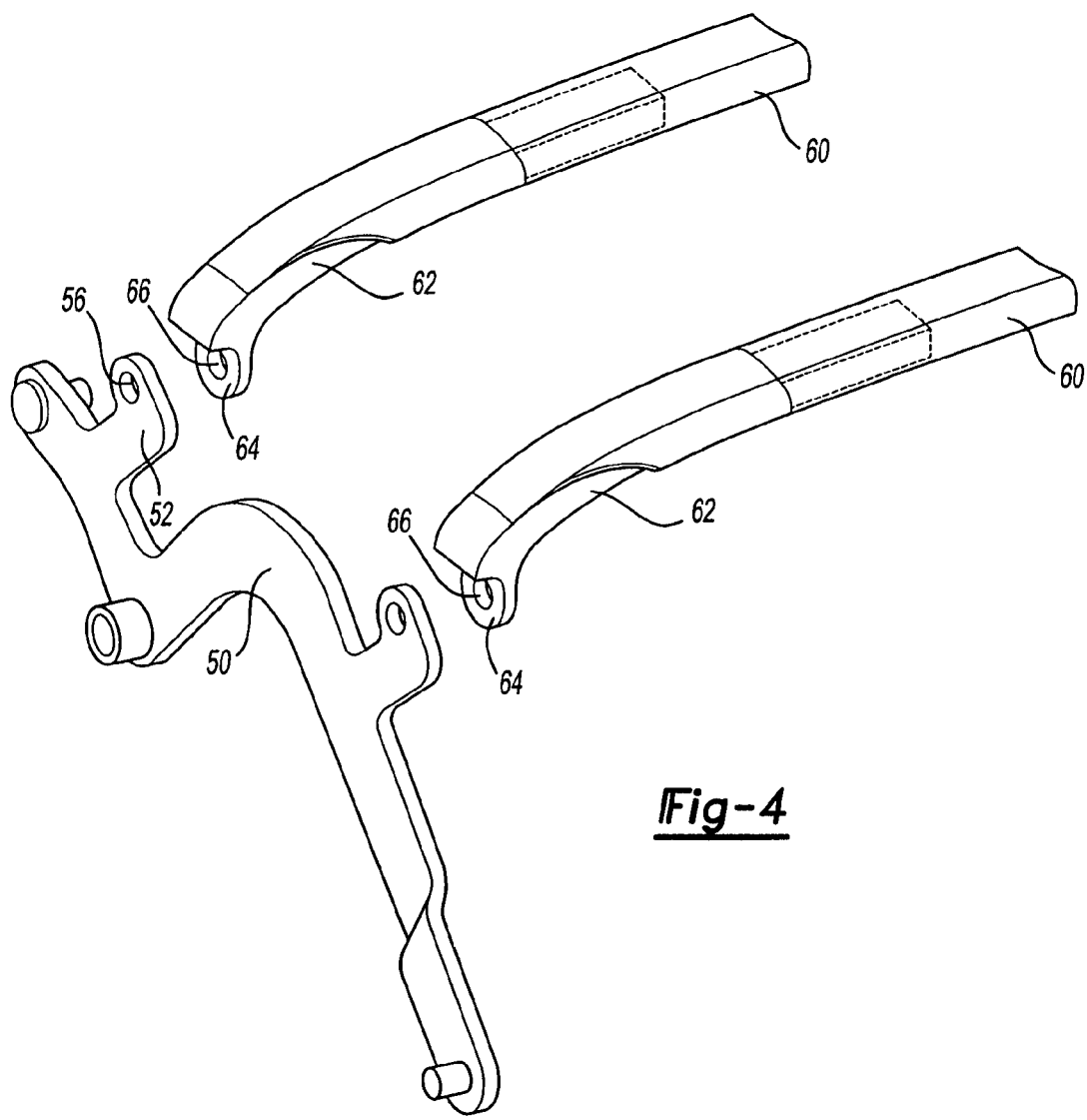
FIG. 4 is a fragmentary exploded perspective view of a center rail and two bows.

Referring to FIG. 4, two bows are shown in an exploded perspective view to show a pivot link 50. Pivot link 50 has first and second attachment flanges 52, 54. Each attachment flange 52, 54 has a hole 56 to which the bows 18 are attached. The bows 18 include a body portion 60, as previously defined, including the top surface 24, headliner facing surface 26, front wall 30 and rear wall 32. The body portion 60 may be formed as an extrusion, as previously described. End inserts 62 may be formed in a Thixomolding® process wherein thixotropic magnesium is injection molded to net size and shape. The end inserts 62 are inserted into interior cavity 28 of the body portion 60. The end inserts 62 each include flange 64 that has a hole 66. The flange 64 and hole 66 are secured to one of the attachment flanges 52 and are connected by a fastener, such as a bolt, rivet, or the like.

Figure 5:
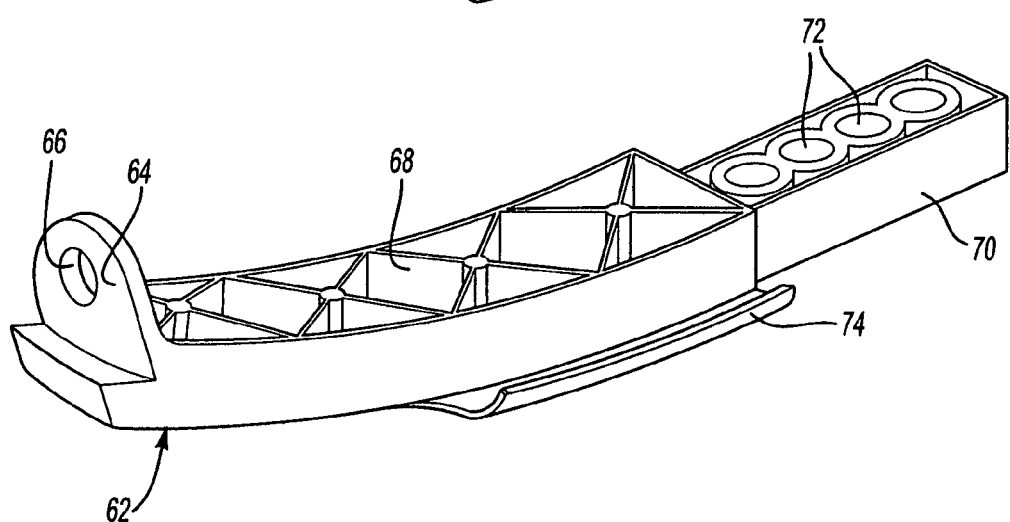
FIG. 5 is a perspective view of a bow end.
Figure 6:
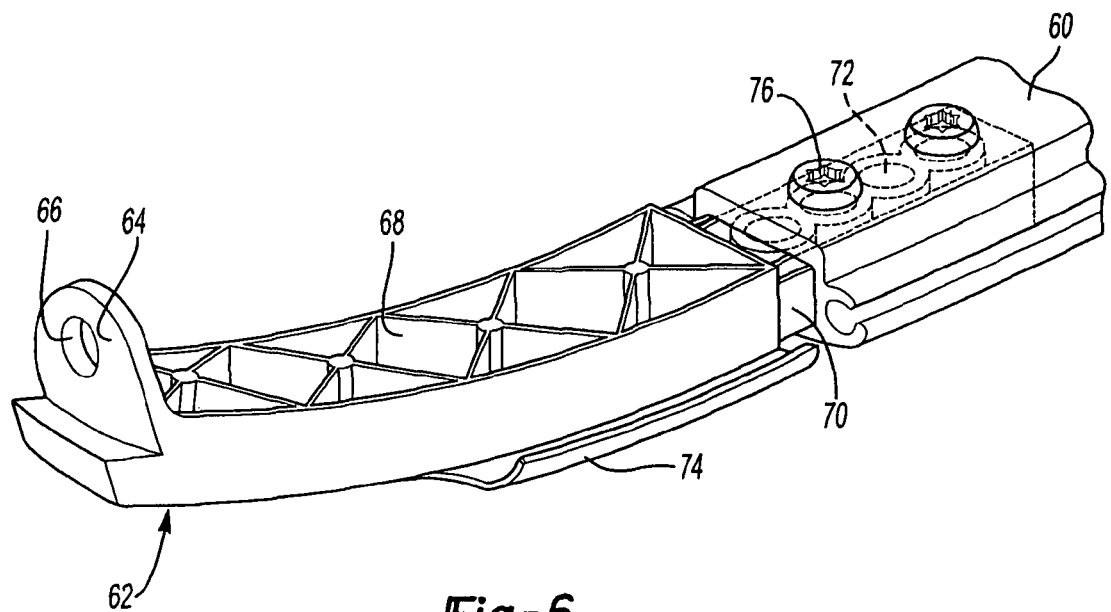
FIG. 6 is a fragmentary perspective view of a bow end and bow in the increased length position.
Figure 7:
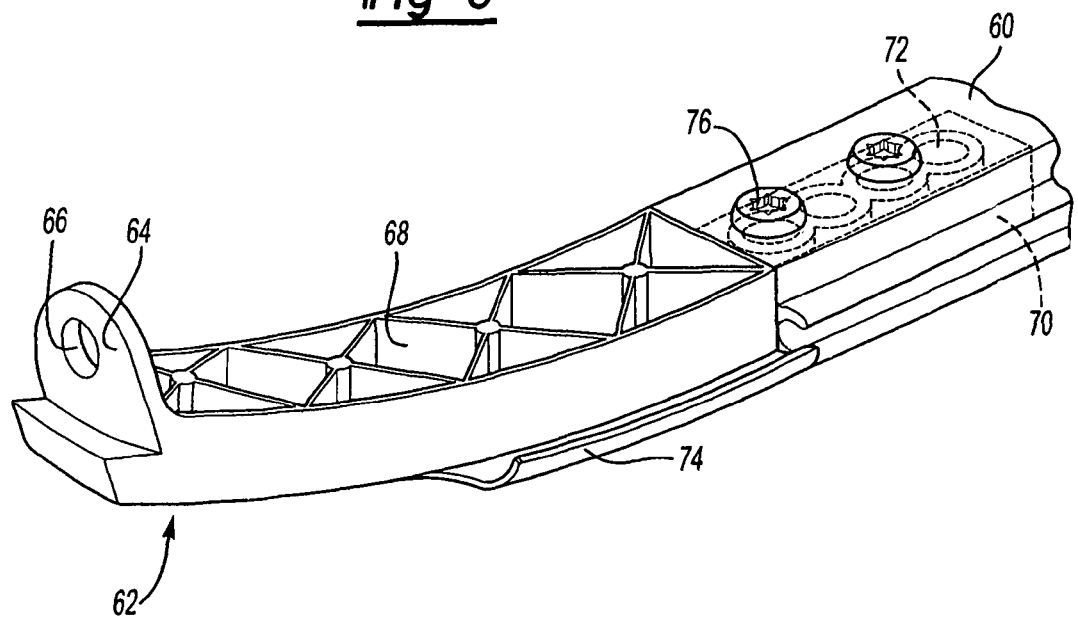
FIG. 7 is a fragmentary perspective view of a bow end and bow in the reduced length position.

Referring now to FIGS. 5-7, the construction of the end inserts 62 and their assembly to the body portion 60 to form the bows 18 will be described in greater detail. The end inserts 62 include a flange 64 and hole 66 on their distal end. The end of the inserts may be formed with reinforcing ribs 68. Plug 70 is provided on the inboard end of the end inserts 62 and has a plurality of fastener bosses 72. A curved flange 74 may be provided on both the forward and rearward edges of the end inserts 62 to conform to the shape of the top surface 24 of each bow 18. The curved flange 74 also functions to locate the bows 18 as they are nested when the top is retracted.

As shown in FIGS. 6 and 7, the end inserts 62 may be secured to the bows 18 in two different positions to thereby provide two differently sized bows 18 formed from identical body portions 60 and end inserts 62. As shown in FIG. 6, a slightly larger bow may be formed by inserting fasteners, such as screws, into the second and fourth fastener bosses 72 of the attachment plug 70. In FIG. 7; the inserts 62 are assembled with the fasteners 76 in the first and third fastener bosses 72 so that the attachment plug 70, or tang, is fully received in the interior cavity 28 of the body portion 60. For example, the number two bow of a convertible top may be slightly shorter than the number three and four bows that are of the same length. The number two bow may be made in accordance with FIG. 7, while the three and four bows may be made slightly larger by assembling them according to FIG. 6. In this way, bows of different lengths may be made from the same component parts that are manufactured with the same tooling.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A convertible top for a vehicle comprising:
    top stack linkage having a right side and a left site;
    a plurality of bows extending transversely between the right and left sides of the top stack linkage, at least one of the bows having a front slot on a forwardly facing edge and a back slot on a rearwardly facing edge;
    a cover spanning between the right and left sides of the top stack linkage and over the bows, the cover having a first flexible welt with a first head portion and a first welt strip, the first head portion being received in one of the front slot and the back slot and the first welt strip extending from the slot in which the first head portion is received, partially around the bow and to the cover;
    a headliner spanning between the right and left sides of the top stack linkage and below the bows, the headliner having a second flexible welt with a second head portion and a second welt strip; the second head portion being received in the other of the front slot and the back slot and the second welt strip extending from the slot in which the second head portion is received, partially around the bow and to the headliner; and
    wherein the first and second flexible welts exert oppositely directed forces on the front and back edges of the bows and wherein the first welt resists relative movement of the cover relative to the bows in one fore and aft direction and the second welt resists relative movement of the headliner relative to the bows in the other fore and aft direction.

2. The convertible top of claim 1 wherein the plurality of bows are attached to the cover and the headliner and function to align the cover and the headliner relative to the top stack and wherein the bows extend in a transverse direction and parallel to each other.

3. The convertible top claim 1 wherein the head portions of the first and second welts are received in a head receiving portion of the slots and the welt strip of the first and second welts extending through a neck portion of the slots and partially around the bow.

4. The convertible top of claim 1 wherein the head portion of each welt has an elongated core portion that is wrapped by the welt strip that extends around the core portion and extends from the head portion through a neck portion of the slot.

5. A top stack for a convertible top having right and left sets of articulated links that are interconnected by a plurality of bows, wherein at least one of the bows comprises:
    a central portion;
    two end portions secured to opposite ends of the central portion, respectively, the end portions each being secured to the central portion in a range of predetermined positions to provide a bow of a specified length depending upon the position in which the end portions are secured to the central portion wherein each of the end portions have a curved fore lip and a curved aft lip that conform to the shape of an upper surface of the central portion.

* * * * *

UNITED STATES PATENT AND TRADEMARK OFFICE
CERTIFICATE OF CORRECTION

PATENT NO. : 8,465,081 B2  
APPLICATION NO. : 10/598340  
DATED : June 18, 2013  
INVENTOR(S) : Jan Just Page 1 of 1

It is certified that error appears in the above-identified patent and that said Letters Patent is hereby corrected as shown below:

In the Claims:

Column 5, Line 28, Claim 1:

After "right side and a left"  
Delete "site" and insert -- side --.

Signed and Sealed this  
Eleventh Day of February, 2014

Michelle K. Lee  
*Deputy Director of the United States Patent and Trademark Office*